J. M. Logan,

Mill Spindle Driver.

No. 103,211. Patented May 17, 1870.

Witnesses.

Inventor.
Jas. M. Logan
by Grindle & Dyer
Attys.

United States Patent Office.

JAMES M. LOGAN, OF SPRINGFIELD, ILLINOIS.

Letters Patent No. 103,211, dated May 17, 1870.

IMPROVEMENT IN MILL-SPINDLE DRIVERS.

The Schedule referred to in these Letters Patent and making part of the same.

*To all whom it may concern:*

Be it known that I, JAMES M. LOGAN, of Springfield, in the county of Sangamon and in the State of Illinois, have invented a new and useful Improved Mill-spindle Driver; and do hereby declare that the following is a full, clear, and exact description thereof, reference being had to the accompanying drawing making a part of this specification, in which—

Letters of like kind denote like parts in each figure.

Figure 1:
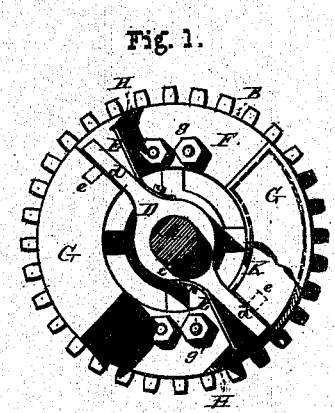
Figure 1 is a plan view of the upper side of my improvement, with a portion of one of the spring-boxes broken out.
Figure 2:
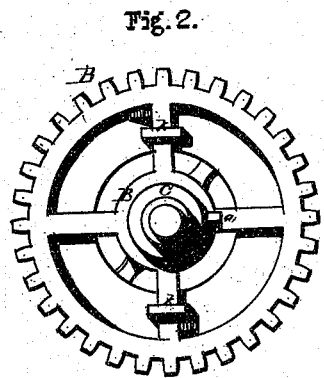
Figure 2 is a plan view of the under side of the same.
Figure 3:
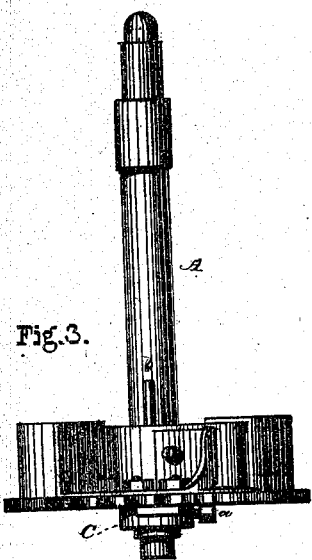
Figure 3 is a side elevation of the same.

The nature and object of my improvement relate to devices intended for preventing what is termed by millers "the back lash" in mill-spindle drivers; and The invention consists in the peculiar form, construction, and arrangement of the spring-boxes; in connection therewith a detachable plate, to which said boxes are secured; in providing each of said boxes with one or more India-rubber perforated springs; in providing the driver-arms with suitable pins, which enter the holes in said springs; in also providing the driver with additional steel springs, to act in a direction opposite to the India-rubber springs, and in the general combination and arrangement of its several parts.

In the drawings—

A represents the spindle, of ordinary construction, which passes vertically through the horizontal center of the gear-wheel B, which is constructed with a center piece, radial arms, and an external rim, provided upon its outside with suitable cog-teeth.

The spindle has upon its lower end a collar, C, which encircles it, which collar is adjustable vertically upon the spindle, by means of a set-screw, a, and is provided, upon that portion of it which passes through the driver, hereinafter described, with a key, b, vertically arranged, which enters into a corresponding slot, c, in said driver.

The driver D, through whose center the spindle passes vertically, is nearly cylindrical in form in its middle portion, and is provided with two arms d d, which extend outwardly toward the circumference of the wheel B.

Each of these arms in turn is provided with a pin, e, at a point opposite the center of the open end of the spring-boxes hereinafter described.

The said driver has also secured to it on opposite sides, near its own center, two curved steel springs E, which extend outwardly nearly as far as the outer ends of the arms d d.

The springs operate on the sides of the arms opposite to the sides which are provided with the pins e, above named.

Upon the wheel B the plate F is placed, which is circular in form, with the center removed, and with its outer edge coincident at all points with the bases of the cog-teeth upon the wheel B.

This plate is secured to said wheel B by means of bands or straps f, which embrace opposite radial arms of said wheel, the ends of which straps, passing up through said plate F, are provided with screw-threads and suitable nuts.

Upon the plate F, and on opposite sides thereof, are secured the spring-boxes G, whose outer and inner lines coincide with the outer and inner circumference of said plate.

These boxes occupy each about one-quarter of a circle, having curved outer and inner parallel side lines, and tops in the same plane as that of the surface of the plate F, which plate forms the bottom of each.

The ends of the boxes next to the driver-arms d d are open, and a portion of the inner side pieces of said boxes at the same end is cut away, so that the driver-arms may enter into the boxes, the interior of which they should fit with much nicety.

The outer end of the spring-boxes is closed.

A stud, H, is also secured to the plate F, near its outer edge, against which stud the outer end of the spring E presses. The face of this stud, which receives the pressure thus indicated, may be provided with an India-rubber cushion.

The boxes G are provided with one or more India-rubber springs, K, inserted therein, said springs being blocks of the shape of the interior of said boxes, and perforated longitudinally in the center. The outer end of said India-rubber spring should be flush with the open end of the box which contains it.

The operation of this device, and the purpose of its several parts, are as follows:

The spindle being in position, passing up through the lower millstone, and holding the upper millstone suspended upon it, and motion being imparted to said spindle by means of the driver D, through gears operating the wheel B, the millstone is rotated with the velocity desired.

By the use of the India-rubber spring K and the steel spring E the pressure of the driver-arms is regulated, and uniformity and steadiness of motion obtained.

When the motion of the wheel B is lessened or arrested, the motion of the millstone attached to the spindle is lessened or arrested, without fear of injurious disturbance of the connecting machinery.

The object of perforating the India-rubber spring is to increase or diminish the strength of the spring to the point desired; the larger the perforation the weaker the spring, and *vice versa*. The curved shape longitudinally of the boxes has also a tendency to increase the elasticity of the India rubber.

The use of the pins $e$, which enter into the perforations of the India-rubber springs, is to keep them in position, so that the spring may be uniform.

The steel springs E press the driver-arms continually against the rubber springs, and they in turn press back said arms against the steel springs.

The object of the key $b$ and slot $c$ is that the wheel may be raised out of gear without removing any key, or destroying the relation of the driver to the springs. The India-rubber springs may be removed by taking off the steel springs, and so uncovering the ends of the boxes.

The advantage of using several of these springs will be found in the economy of removing the outer ones, when worn, and supplying their places with similar new ones.

I do not wish to confine myself, in the use of my improvement, to mill-spindle drivers, as it is equally applicable to all shafts or gearing where heavy weights are rotated with velocity.

Having thus fully set forth the nature, merits, and operation of my device, and the purpose of its several parts,

What I claim as my invention, and desire to secure by Letters Patent, is—

1. In combination with the spring-boxes G, the perforated India-rubber springs K, constructed as described, and arranged to operate as and for the purpose set forth.

2. The driver D, provided with arms $d\ d$ and with pins $e$, in combination with the India-rubber springs K, when constructed as described, and for the purpose set forth.

3. The combination of the driver D, the steel springs E, the India-rubber springs K, the spindle A, and the gear-wheel B, substantially as described and for the purpose set forth.

4. The combination of the gear-wheel B with the plate F, provided with the spring-boxes G and the studs H, when constructed and arranged to operate as and for the purpose set forth.

In testimony that I claim the foregoing I have hereunto set my hand this 25th day of February, 1870.

JAMES M. LOGAN.

Witnesses:
 GEO. O. MARCY,
 C. S. ZANE.